(12) United States Patent
Parikh

(10) Patent No.: US 12,402,700 B2
(45) Date of Patent: *Sep. 2, 2025

(54) GEMSTONE CONTAINER, LIGHTING DEVICE AND IMAGING SYSTEM AND METHOD

(71) Applicant: Parikh Holdings LLC, Scarsdale, NY (US)

(72) Inventor: Aniket Parikh, Scarsdale, NY (US)

(73) Assignee: Parikh Holdings LLC, Scarsdale, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 18/173,984

(22) Filed: Feb. 24, 2023

(65) Prior Publication Data

US 2023/0200508 A1 Jun. 29, 2023

Related U.S. Application Data

(63) Continuation of application No. 17/207,418, filed on Mar. 19, 2021, now Pat. No. 11,589,659.

(51) Int. Cl.
*G06T 7/00* (2017.01)
*A45C 11/16* (2006.01)
(Continued)

(52) U.S. Cl.
CPC ............. *A45C 11/16* (2013.01); *A45C 13/02* (2013.01); *A45C 15/06* (2013.01); *G01N 21/87* (2013.01);
(Continued)

(58) Field of Classification Search
CPC ......... A45C 11/16; A45C 13/02; A45C 15/06; A45C 2200/10; G06T 7/74; G06T 7/001; G01N 21/87
See application file for complete search history.

(56) References Cited

U.S. PATENT DOCUMENTS 5,992,177 A * 11/1999 Beard ................... A44C 17/02
63/26
11,132,779 B2 9/2021 Parikh
(Continued)

FOREIGN PATENT DOCUMENTS

CN 203492978 U 3/2014
CN 104290964 A 1/2015
(Continued)

OTHER PUBLICATIONS

Peuser. "DE 202014001327 U1 Translation". (Year: 2014).*
(Continued)

*Primary Examiner* — Zhihan Zhou
(74) *Attorney, Agent, or Firm* — LEASON ELLIS LLP

(57) ABSTRACT

Systems and methods for evaluating gemstones are disclosed. The system includes a gemstone holding case, an illumination pad and an image capturing and gemstone evaluation device. The case includes a transparent viewing window in a top wall, a translucent bottom wall and a compressible light-diffusing pad for receiving gemstones thereon. The case and pad are dimensioned such that, when closed, the viewing window presses the gemstones into the pad holding them in place and level and allowing for in situ gem imaging. The illumination pad includes embedded LEDs for selectively illuminating the portion of the pad on which the case is placed. The controllable lighting, translucent case and diffusive pad serves to evenly light the gems and reduce unwanted light thereby improving the images and analysis performed using the image capturing and gemstone evaluation device. Methods for analyzing gemstones under diffuse lighting using the system is also disclosed.

19 Claims, 14 Drawing Sheets

(51) Int. Cl.
*A45C 13/02* (2006.01)
*A45C 15/06* (2006.01)
*G01N 21/87* (2006.01)
*G06T 7/73* (2017.01)

(52) U.S. Cl.
CPC ............... *G06T 7/001* (2013.01); *G06T 7/74* (2017.01); *A45C 2200/10* (2013.01)

(56) References Cited

U.S. PATENT DOCUMENTS

| | | |
|---|---|---|
| 11,222,420 B2 | 1/2022 | Parikh |
| 2016/0174675 A1* | 6/2016 | Bedman ................. A47F 3/005 206/6.1 |
| 2018/0247399 A1* | 8/2018 | Parikh ................ G06V 10/7515 |

FOREIGN PATENT DOCUMENTS

| | | |
|---|---|---|
| DE | 1630696 U | 11/1951 |
| DE | 202014001327 U1 | 7/2014 |

OTHER PUBLICATIONS

International Search Report and Written Opinion in PCT Application No. PCT/US22/20875, mailed Jun. 22, 2022. 6 pages.
Partial Supplementary European Search Report in EP Application No. 22772254.3-1001/4308908, mailed Jan. 2, 2025 (13 pages).
Extended European Search Report in EP Application No. 22772254.3-1001/4308908, mailed Mar. 25, 2025. [11 pages].

* cited by examiner

GEMSTONE CONTAINER, LIGHTING DEVICE AND IMAGING SYSTEM AND METHOD

CROSS-REFERENCE TO RELATED APPLICATION

This is a continuation of U.S. patent application Ser. No. 17/207,418, titled "GEMSTONE CONTAINER, LIGHTING DEVICE AND IMAGING SYSTEM AND METHOD," and filed Mar. 19, 2021, the disclosure of which is incorporated herein in its entirety.

FIELD OF THE DISCLOSURE

The present disclosure relates generally to systems for viewing and analyzing gemstones, and more particularly to a gemstone container, lighting device and imaging system and method of imaging and analyzing gemstones using same.

BACKGROUND OF THE DISCLOSURE

Jewelry items, such as diamonds and other gemstones, are often kept in boxes with a clear top window to show the "face up" look of the gemstones. When these boxes go out for processing or to customers for viewing, they may have to be left with the third party, even for a short time. As such, when the gemstones arrive back to the owner they are typically checked to verify the received gemstones are the same ones that were shipped out. Currently verification typically involves manually removing each gemstone from the box to manually compare each gemstone individually to a previously saved record, capturing an image of each gemstone for comparison with the preexisting record, or analyzing each gemstone using an automated gemstone analysis system. However, there is no convenient way for performing batch processing (e.g., verification) of gemstones, or gemstone verification without removal from the box.

Imaging gemstones is time consuming and, as the sizes get smaller it is harder to get a clear image of what's inside a gem. For example, it is hard for more ubiquitous devices like a smart phone camera to perfectly focus on a gemstone due to its reflective nature and shape of the gemstone. This is for example due surface heights and curves and depths and due to depth of field or perception. Additionally, bad or improper lighting can spoil the quality of a gemstone image making it difficult to perform verification of the imaged gemstone using the image.

Additionally, multiple gemstones stored in a box might often have different physical parameters including, different types, heights, shapes, sizes, cuts, reflective indexes and the like. This can make focusing on multiple gems at the same time difficult for conventional imaging devices such as those found on a smartphone.

Additionally, in the situation where a gemstone is part of a jewelry item (e.g., set in prongs of a ring or bracelet) there is no way of easily bifurcating the gem from the jewelry item in an image. This can be due to lighting or imaging constraints. This further makes it very difficult to process multiple gemstones on a jewelry item, or multiple gemstones on multiple jewelry items in batches. Indeed, it is hard to do so even with high tech instruments like laser scanners because the light reflects off the shiny metal surface or the gems like diamonds and facets.

Another practical challenge associated with existing gemstone boxes is that the boxes typically have an opaque plastic bottom (e.g., black or colored plastic) that can be labeled on the bottom using sticky labels. The labels are hard to remove and leave adhesive residue on the box. As a result, existing boxes are not easily re-used and are often discarded, creating waste and increased costs.

It is in regard to these and other problems in the art that the present disclosure is directed to provide a technical solution for holding, illuminating and imaging of gemstones and an associated evaluation technique that overcome these and other problems inherent to current systems.

SUMMARY OF THE DISCLOSURE

According to an embodiment of the present invention, a gem evaluation system is provided. The gem evaluation system comprises a case for holding one or more loose gemstones. The case includes a top wall and a bottom wall, wherein an internal volume of the case is bounded by the top wall and opposing bottom wall. The top wall is separable from the bottom so as to transition the case between an open state, in which the internal volume of the case is accessible, and a closed state, in which one or more gemstones are enclosed within the internal volume of the case. The top wall comprises a transparent viewing window through which the one or gemstones can be evaluated. Additionally, the bottom wall is one or more of translucent or transparent. The case further includes a gemstone pad, provided within the internal volume of the case. The pad is for receiving the one or more loose gemstones on a top surface of the gemstone pad. The gemstone pad is formed of a compressible material configured to allow light to pass through the compressible material into the gemstones.

According to a further aspect, the gem evaluation system further comprises an illumination device. The illumination device includes a base having a top surface on which the bottom wall of the case can rest during gemstone evaluation. The illumination device also includes an array of light emitters disposed within the base. The light emitters are configured to emit light from at least the top surface of the base and thereby illuminating the internal volume of the case resting thereon.

According to a further aspect, the gem evaluation system further comprises a gemstone imaging and evaluation device. The gemstone imaging and evaluation device includes an image capturing device configured to capture an image of the one or more gemstones through the viewing window of the case. The imaging and evaluation device also includes an external storage component configured to store data corresponding to the image. Additionally, the imaging and evaluation device includes a processing unit configured to analyze the image of the jewelry item to identify, within the image, at least one of one or more features of the gemstone.

Any combinations of the various embodiments and implementations disclosed herein can be used. These and other aspects and features can be appreciated from the following description of certain embodiments of the invention and the accompanying drawings and claims.

Figure 1A:
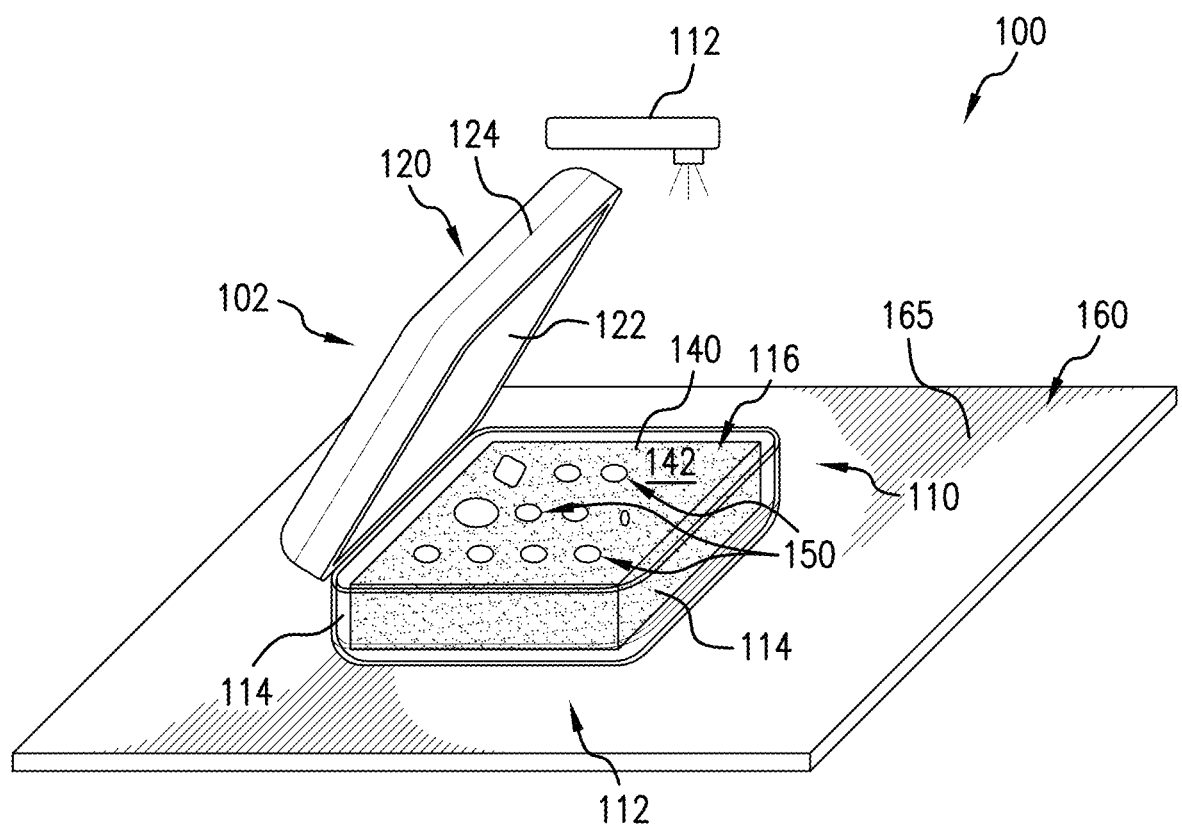
FIG. 1A is a top perspective view diagram of an example gemstone evaluation system including a gemstone container, illumination device, imaging and gem evaluation device, according to an embodiment.

It is noted that the drawings are illustrative and not necessarily to scale.

DETAILED DESCRIPTION OF CERTAIN EMBODIMENTS OF THE DISCLOSURE

Example embodiments of the present disclosure are directed to a gemstone evaluation system that includes one or more of a gemstone holder, illumination device, imaging and gemstone evaluation device, as well as methods for imaging and analyzing a gemstone using same. In some cases, the system can be used for gemstones that can be part of a jewelry item. More often however, the system is used for analyzing one or more loose gemstone. However, it should be understood that embodiments described as being used with gemstones can similarly be adapted for use with jewelry items, more generally, and vice versa.

The gemstone holder is provided for containing one or more gemstones during examination, storage and otherwise. In an embodiment, the holder comprises a plastic case having a clamshell configuration, for example. The holder has at least a translucent bottom wall and a transparent viewing window in the top wall. Within the plastic case is a translucent, light diffusing, pad that is compressible. In use, a plurality of gemstones can be placed on the top surface of the pad, typically in a "face up" orientation (i.e., with the gemstone faces up and bottom ends pointing down). The case and pad are preferably configured such that, when the top of the case is closed, the viewing window presses the gemstones down into the pad. The gemstones are thus held in place and the respective top faces of the gemstones are level. The translucent bottom of the box and diffusive properties of the gemstone pad serves to evenly light the gems without glare and other unwanted light artifacts thereby exposing gemstone features such as inclusions in a manner that can more easily be imaged. The gemstone holder configuration also helps to avoid having to remove the gemstones from the case for examination. Another advantage over current approaches to gemstone imaging is that the gem doesn't need to be "held" by a gem holder such as tweezers or a prong-like mounting device, which obscures a lot of the gem can cause some inclusions to be missed. In another example the gems may be placed "face down" so as to capture images from the culet, which is pointed toward the imaging window, and with the diffused light coming in from the "face" of the gemstone.

Additionally, as further described herein, the system further comprises a lighting platform that the case can be placed for illumination and imaging. Within the lighting platform is an array of embedded light emitters, such as LEDs, that can be selectively illuminated. The area of the lit portion can be adjusted to match the size of the box, and the lighting spectrum can be adjusted as well. This also improves the way the gemstones are lit, avoids glare, unwanted reflections and the like.

Additionally, as further described herein, the system further comprises a gemstone evaluation device that includes an imaging device and a processing computer. In some such embodiments, an image of one or more gemstones contained within the exemplary gemstone container is captured and analyzed so that the position of inclusions or other features can be determined and the quality of the gemstone can be evaluated based on objective features. In some embodiments, the gemstone evaluation device can capture images of a jewelry item comprising one or more gemstones mounted to a metal part (e.g., a ring or bracelet). For example, quality of the gem or jewelry item can be evaluated based on inclusions contained in the jewelry item and characteristics of those inclusions. Characteristics of the inclusions can include objectively ascertainable criteria such as sizes of inclusions, proximity of inclusions to one another, proximity of inclusions to portions of a jewelry item that are less visible and/or are able to be obscured by a prong, and/or any other suitable characteristics. Quality of the jewelry item can also be evaluated based on factors such as color of the jewelry item, color of inclusions relative to color of the jewelry item, dimensions and/or size of the jewelry item, shape or shapes of the jewelry item, facets of the jewelry item (e.g., characteristics of one or more facets that can be identified using the techniques described herein), and/or any other suitable factors.

FIG. 1A is a top-side perspective view diagram of an example system 100 for holding, illuminating and imaging a jewelry item such as a gemstone, according to an embodiment of the present invention. The system 100 includes a gemstone container 102 (also referred to as a case or box or holder). The system 100 also includes a lighting platform 160, for illuminating the gemstones. In some embodiments, the system 100 can also include an image capturing and gem evaluation device 112 for imaging and evaluating the gemstones.

Gemstone Container

The exemplary gemstone container 102 is of the type referred to as a clamshell, comprised of a bottom portion 110 and a top portion 120. The bottom portion 110 includes a bottom wall 112 and sidewalls 114. The top portion 120 includes a top wall 122 and sidewalls 124. The walls of the container encompass the internal volume 116 of the container 102.

At least a portion of the top wall is preferably transparent so as to provide a "viewing window" through which the gemstones 150 within the case can be viewed and imaged while the case is closed. The top portion 120 is hingedly mounted to the bottom portion such that the top portion can be pivoted open to provide access to the internal volume 116 or pivoted down into a closed position in which the bottom ends of the top sidewalls 124 mate with the top end of the bottom sidewalls 114.

The viewing window of the top wall 122 of the container can be made of, for example and without limitation, a plastic or glass material that has a suitable transparency that enables the gemstones to be imaged through the top wall without undue distortion. The viewing window is preferably a scratch proof/resistant material so as to avoid scratches artificially introducing features into the images that might cause, say, a scratch to be confused with a gemstone inclusion or diffuse light to show one gem as two or more gems. Further, the material is also preferably easy to clean and be kept dust free.

In addition, some or all of the bottom wall 112 of the container is configured to allow light to be transmitted therethrough so as to enable the internal volume of the box to be illuminated through the bottom wall 112. The bottom wall can be configured to have light transmitting properties defined according to the intended application. In some embodiments, the bottom wall can be translucent, so as to diffuse light passing therethrough. In some embodiments, one or more sections of the bottom wall can be transparent, so as to not interfere with the light passing therethrough. One or more walls of the bottom portion 110 can be made from, for example and without limitation, a plastic or glass or other material having suitable light transmitting, reflecting and/or blocking properties.

Preferably, in some embodiments, the bottom wall is made of a material having a substantially uniform color (or uniform lack of color, e.g., white or clear), such that the bottom wall does not unevenly distort the color of the light passing therethrough.

The one or more of the sidewalls of the case can be configured to have light transmitting properties defined according to the intended application. In some embodiments, one or more of the sidewalls 114 or 124, or portions thereof, can be configured to permit illumination of the internal volume through the sides. Accordingly, in some embodiments, one or more sidewalls can be translucent. In some embodiments, one or more sidewalls can be substantially transparent, allowing light to travel through without interference.

One or more side walls of the container can, in some embodiments, be opaque. In some embodiments, one or more side-walls can be reflective in nature. In some embodiments, the one or more side-walls can be curved to diffuse or concentrate the light onto or away from the gems. In some embodiments, the internal structure of the sidewalls can comprise reflective substances or inbuilt polarizers so as to create certain visual results that further help in identifying the gems, gem features, or any other or treatments done to it. Alternatively, in some embodiments, one or more sidewalls can be omitted.

It should be understood that, in some embodiments, one or more walls of the container 102 can comprise a combination of materials defining regions having respective physical and optical properties, for example, a top wall having a translucent plastic edge region that surrounds a transparent viewing window made of scratch-resistant plastic. Preferably, in an embodiment, the container can comprise a clear bottom, opaque sides and a clear top. For smaller gems, it can further be preferable for a white/translucent bottom and a clear top.

It should be understood that the rectangular clamshell container 102 is provided as a non-limiting example. Containers of other sizes, shapes and configurations could be used to hold gemstones or jewelry items without departing from the scope of the disclosed embodiments. For example, gemstones can similarly be held using two opposing glass plates with a diffusive gemstone holding pad sandwiched there-between. Additionally, in accordance with one or more embodiments, aspects of the exemplary system 100 can be specifically adapted for holding, illuminating and analyzing other items such as a jewelry item (e.g., a ring, bracelet and the like).

Gemstone Pad

Figure 1B:
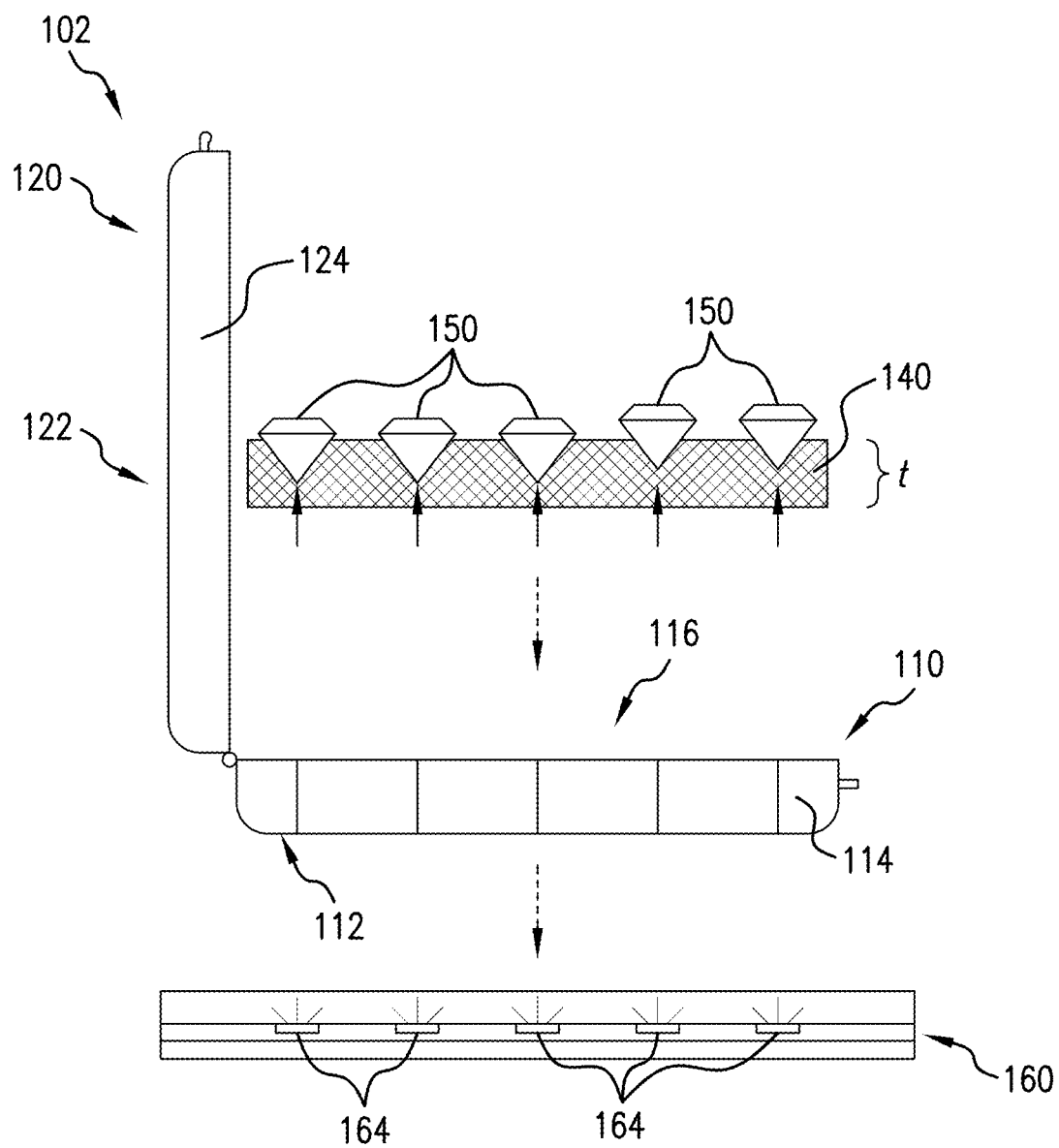
FIG. 1B is an exploded side view diagram of an example gemstone container and illumination device of the system of FIG. 1A, according to an embodiment.

Placed within the internal volume 116 of the container, against the interior surface of the bottom wall, is a pad 140 for holding one or more gemstones. FIG. 1A shows, in a simplified illustration, one or more gemstones 150 (the gemstones 150 and any other gemstone discussed herein being referred to herein at times as a "gem" or "stone") arranged on or through a top surface 142 of the pad 140. FIG. 1B, is an exploded side view of the container 102, showing the pad 140 separated from the top and bottom portions of the container, showing the container in the open configuration and showing the container elevated away from a lighting platform 160.

The pad 140 is preferably made of a compressible material. The pad is also preferably made of a material that allows light to be transmitted therethrough. For instance, the pad can be a translucent material configured to diffuse the light shone into the internal volume through the bottom wall 112. For example and without limitation, the pad can be made of a microfiber cloth, an open cell or closed cell polymer foam material having the preferred optical properties.

Because the structural pattern of the material can allow or alter the passage of light, in some embodiments, the optical properties of the pad material can be defined for one or more types of gems. Preferably, for certain gem types such as diamonds, the pad is made of a material that allows light to move uniformly. For example, a blue polymer/foam that had octahedral shaped pattern can leave shadows that internally reflected off a diamond's walls reducing image clarity. By comparison, a microfiber cloth, cotton or wool cloth, with uniform compression of the material can provide a suitably even light diffusion.

Preferably, in some embodiments, the pad is made of a material that does not include imprinted/drawn patterns, or knitted patterns, as such features can cause wavy cross patterns of light, distorting the gemstone image and creating false shadows. For example, such a material can include a microfiber cloth, open or closed cell polymer foams or non-woven materials. Suitable natural materials that provide preferred light diffusing properties include compressed cotton, wool, and fine cloth/silk.

It is further preferable that the pad material is of the type that does not shed threads or lint-type particles, which can act like dust and cover the gems and, if not cleaned properly, show as dust or dirt in the gemstone images.

It is further preferable that the pad material is not greasy. In some embodiments, the pad is made of an anti-static material to avoid static electricity attracting dust. In some embodiments, the pad material can comprise a more readily available and disposable material, for instance, paper sheets. Accordingly, if the sheet is punctured or torn by the pointed bottom culets of the gems, for example, it can be thrown away after one or a few uses.

Preferably, in some embodiments, the pad is made of a material having a uniform coloring (or lack of color), such that the pad does not unevenly distort the color of the light passing through the gems. In some embodiments, say for use with diamonds, the pad is preferably white. However, in some embodiments, say for use with other gems like rubies or emeralds, the pad can be colored to provide a yellowish tint to the lighting.

The thickness of the pad can depend on the size shape and depth of the gems themselves. Preferably, the pad is thick enough to protect the pointed culet at the bottom of the gem (if having a pointed bottom), and to give enough cushion to keep gems secure and from moving and impacting the top wall and with one another. Accordingly, the pad is designed to provide enough pressure between the top and bottom walls to keep the gems stable and safely in place. Additionally, it is preferable for the pad to be sized to cover the entire footprint of the internal volume and thereby touching the side walls to avoid gems falling into crevices at the sidewalls.

The pad is also designed to have a compressibility (e.g., elasticity, density, hardness) that is suitable for resisting a gem being totally embedded into the pad, which would cause the sides of the gem to be enveloped and not visible. The pad is also compressible and has a suitable softness so as to not break a pointed culet or scratch the surface of a gem.

The material properties and size of the pad can also be defined as a function of the size of the gemstones. If very small gemstones are being contained, the need for tightness against the viewing window may require an increased pad density (e.g., to resist compression) and/or pad thickness. Small gemstones can also require finer materials having less surface grain, smaller voids or hair-like features that could obscure portions of a small gem.

Figure 1C:
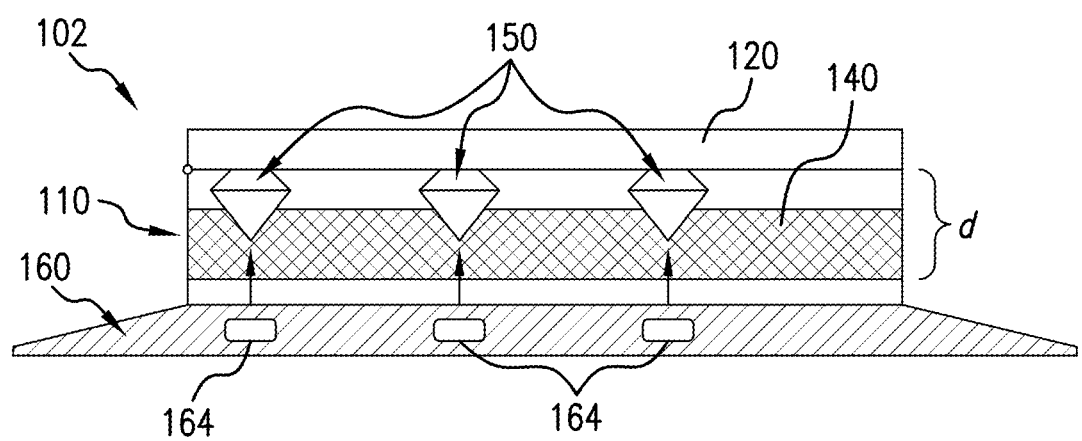
FIG. 1C is a cut-away side view diagram of an example gemstone container and illumination system of FIG. 1A shown in a closed configuration, according to an embodiment.

As shown in FIG. 1B and FIG. 1C, which is a cut-away side view of the closed container 102 with the pad 140 and gemstones 150 disposed therein, the thickness t of the pad 140 is similar to the depth d of the internal volume 116 and has suitable compression characteristics to allow for small and large gemstones alike to be placed in the same box and, when the top portion 120 is closed, the top faces of the gemstones are maintained at the same level and in proper "face up" orientation. As noted, the container 102 and pad 140 are preferably dimensioned such that, when the top 120 is closed against the bottom 110, the underside of the top wall 122 presses the gemstones 150 down into the pad 140. The gemstones are thus held in place and the respective top surface of the gemstones are level. Maintaining the top of the gems in the same level plane allows for more easy comparison. FIG. 1B illustrates the possibly non-level position of the gemstones when the container is not closed.

Figure 2A:
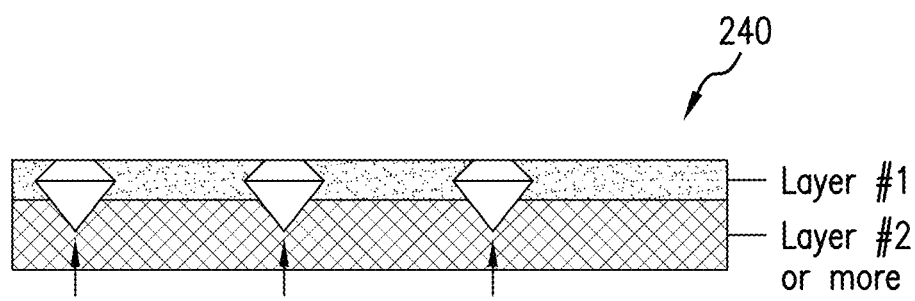
FIG. 2A is a side view diagram of an example gemstone mat usable in the gemstone container of the system of FIG. 1A, according to an embodiment.

The diffusive pad 140 protects the bottom (or "culet") from breaking and allows diffused light to pass up into the gem thereby enhancing the facet structure and inclusions clearly. While FIGS. 1A-B show the gemstone pad comprising a single layer material, it should be understood that the gemstone pad can comprise multiple layers of material. FIG. 2A is a side view of an exemplary configuration of a gemstone pad 240 having two layers of material. For example, a top-most layer of material can be comprised of a more elastic/compressible material having voids (or air pockets) and a thickness that is suitable for receiving at least the bottom portion of gemstones of varying sizes, expanding to accommodate the gemstone's size, and allowing the gemstone to be pressed into the pad such it is maintained face up while the box is opened and closed. The bottom layer of material can have a relatively lower compressibility/elasticity and a thickness sufficient to cushion the culet and to provide some resistance such that the top face of the gemstones abut the bottom surface of the top wall when the container is closed. The thickness and material properties of the one or more layers comprising the pad can be defined depending on the particular requirements of the application.

For example, the pad can comprise a microfiber pad, a cotton pad with ribbed/square thread patterns, a sponge, or a sponge-like synthetic foam. Varying types of materials, having varying properties such as color, light transmission, diffusion, opacity, thickness, compressibility/elasticity, density, porosity, can be used individually or in combination to achieve a pad having the necessary compression and light transmitting properties.

In some embodiments, the pad can further be provided with slits/slots extending from the top surface at least partially into the pad to more securely hold the gem from any side or angle. This can also make viewing the girdle and edges of a gem better from the sides, for better or easier imaging.

The light transmissive bottom of the container 102 and diffusive properties of the gemstone pad 140/240 serves to evenly light the gems without glare and other unwanted light artifacts to expose inclusions and other gemstone features such that they can be imaged better, detected and analyzed. For instance, the gemstone features that are enhanced can include internal or external features, or dust and liquid residues of any sort, internal or external graining features that can be found by light distortion or blockage and the like. The diffusion will take away the unfocused nature of the gem and turn it into a flat surface that is more easily captured in an image. The facets are also more clearly demarcated/visible and easier to image.

Whereas current gem holding and imaging techniques tend to cover up to two percent of the gem, effectively hiding inclusions, embodiments of the gemstone holder can allow full view.

The exemplary configuration of the container 102 also helps to avoid having to remove the gemstones 150 during imaging and examination. The container 102 thus is configured to securely hold the gems during imaging and allows images to be taken from at least one side (e.g., top 122). It can further allow for light to be directed into the container from the side of the container opposite the imaging window (e.g., bottom 122), as well as from other directions. The viewing pane (e.g., top wall 122) is preferably scratch resistant and clean and transparent and non-distorting of the image/lighting. The imaging preferably takes place with the top closed because, if no top pane is there, the image can be lower quality since the gems will not necessarily be maintained in a uniform orientation and level and not properly receiving diffused lighting from below.

In an embodiment, the container can be omitted and a gemstone can be manually held on or over the light diffusing pad 140 for imaging and analysis. For example, the gemstone can be held using tweezers, with the tweezer acting like the walls and picked up over the pad and the gem imaged over the diffused light.

Gemstone Illumination Device

The system 100 also includes a gemstone illumination device 160, also referred to herein as an illumination platform or lighting mat. In an embodiment, the lighting mat can comprise a base substrate that is made of a rigid, semi-rigid, flexible or foldable material. FIG. 1A-1C illustrate a lighting mat having a generally flat top surface 165 from which light can be directed into the bottom of the gemstone container 102 resting thereon.

Figure 1D:
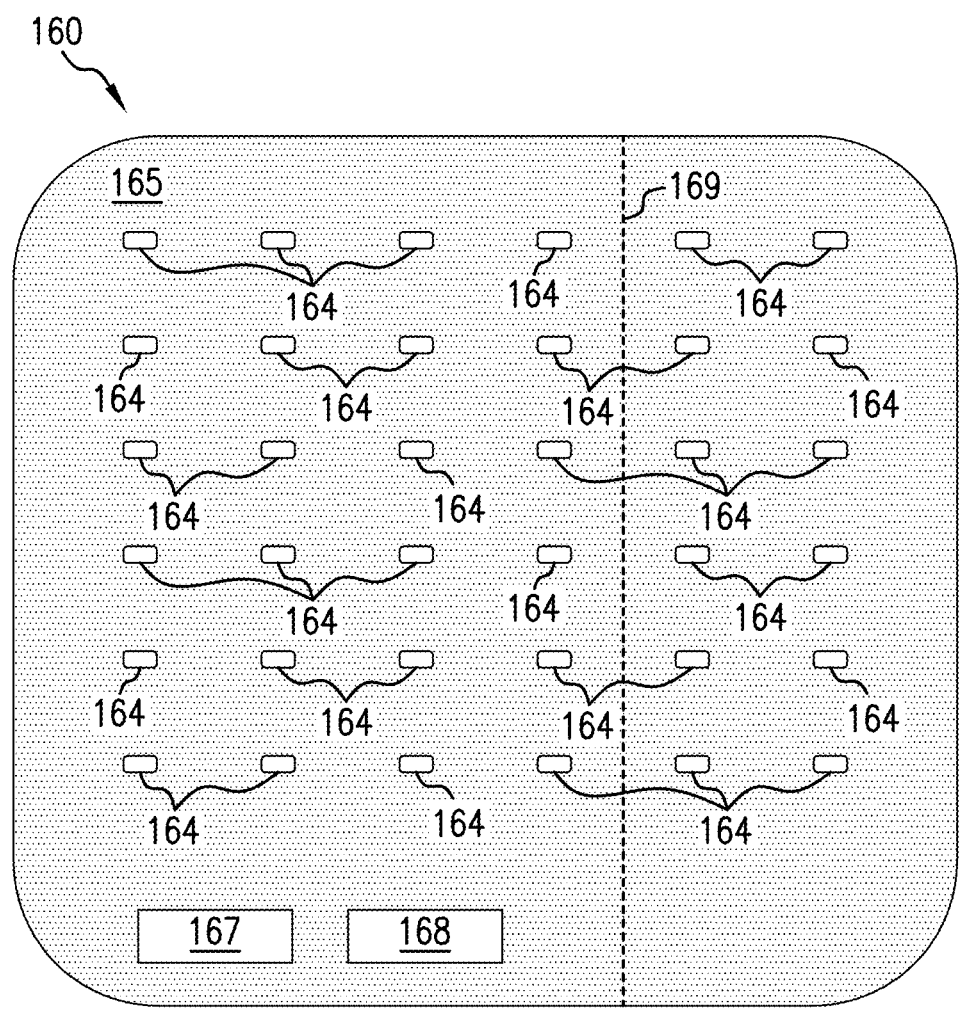
FIG. 1D is top-view diagram of an example gemstone illumination device of the system of FIG. 1A, according to an embodiment.

Returning to FIG. 1D, FIG. 1D illustrates a top view of the lighting mat 160 with all other elements of the system 100 omitted. The lighting mat 160 can comprise light emitters 164 such as LEDs or other types of light emitting devices arranged on or within the base. The LEDs can be exposed on or otherwise configured to shine through the top surface 165 of the base. For example, in an embodiment the LEDs are exposed through openings in the base. By way of further example, the LEDs can be embedded below the top surface 165 and shining through the top surface 165.

As shown, the LED's can be arranged in a two-dimensional, rectangular array, however other arrangements of LEDs can be provided. For example, LEDs can be arranged along concentric circles of increasing radius from a center point to illuminate a circular gemstone container. The spacing between LEDs can vary, however, a consistent spacing is preferable to ensure uniform lighting.

The LEDs can be configured to be selectively illuminated to, for example, illuminate an area of the lighting mat that corresponds to the location, size and shape of the bottom surface of the gemstone holder (not shown). In some embodiments, the LEDs can be configured to be moveable.

In some embodiments, the LEDs can be configured to emit light having one, or more, of a variety of possible colors/wavelengths. In some embodiments, the light emitters have an adjustable intensity. Various properties of the light emitted by one or more LEDs (e.g., color, intensity among others), individually or collectively, can be selectively controlled by a controller via embedded electronic circuitry used to power and connect the controller to the LEDs.

In some embodiments, the lighting mat can include its own processor 167, for selectively controlling the light properties of the mat and its LEDs 164. The mat can also include an input/output (I/O) circuit 168. I/O circuit 168 can include a user input device, such as knobs or buttons, with which a user can interact to provide control inputs to the processor 167. Control inputs can define various parameters of the lighting mat that are controlled by the processor 167, including, for example, a location on the mat to illuminate, a size or shape of the area of the mat to illuminate, which LEDs to turn on/of or adjust, one or more light parameters (e.g., intensity, wavelength) for one or more of the LEDs.

I/O circuit 168 can also include a wireless (e.g., WIFI or Bluetooth) or wired communication connection providing communication between the processor 167 and remote devices such as the gem evaluation device 112, thereby enabling the processor to receive control inputs from the connected device and output information relating to the platform's operation thereto. Accordingly, in some embodiments, the gem evaluation device 112 can be configured to actively control the lighting mat 160 in accordance with information captured by an imaging device. For instance, based on a location of the gemstone being imaged determined by the gem evaluation device 112, the light properties of one or more LEDs around that particular location can be adjusted to facilitate imaging and analysis. In some embodiments, the lighting mat 160 can be controlled by other computing devices in communication therewith, for example, a mobile phone configured to be used by a user to input control instructions defining, say, a particular intensity among a range of possible intensities, or a particular wavelength among a range of possible wavelengths. These controls can also be automated in some embodiments. For instance, the gem evaluation device 112 can be configured to detect glare and, if glare is detected for a particular location within or around a gemstone image, be further configured to output a control signal adjusting lighting parameters of the mat, say, changing the area of the mat that is illuminated, reducing the intensity of one or more of the LEDs in relation to the location, and the like.

Figure 2B:
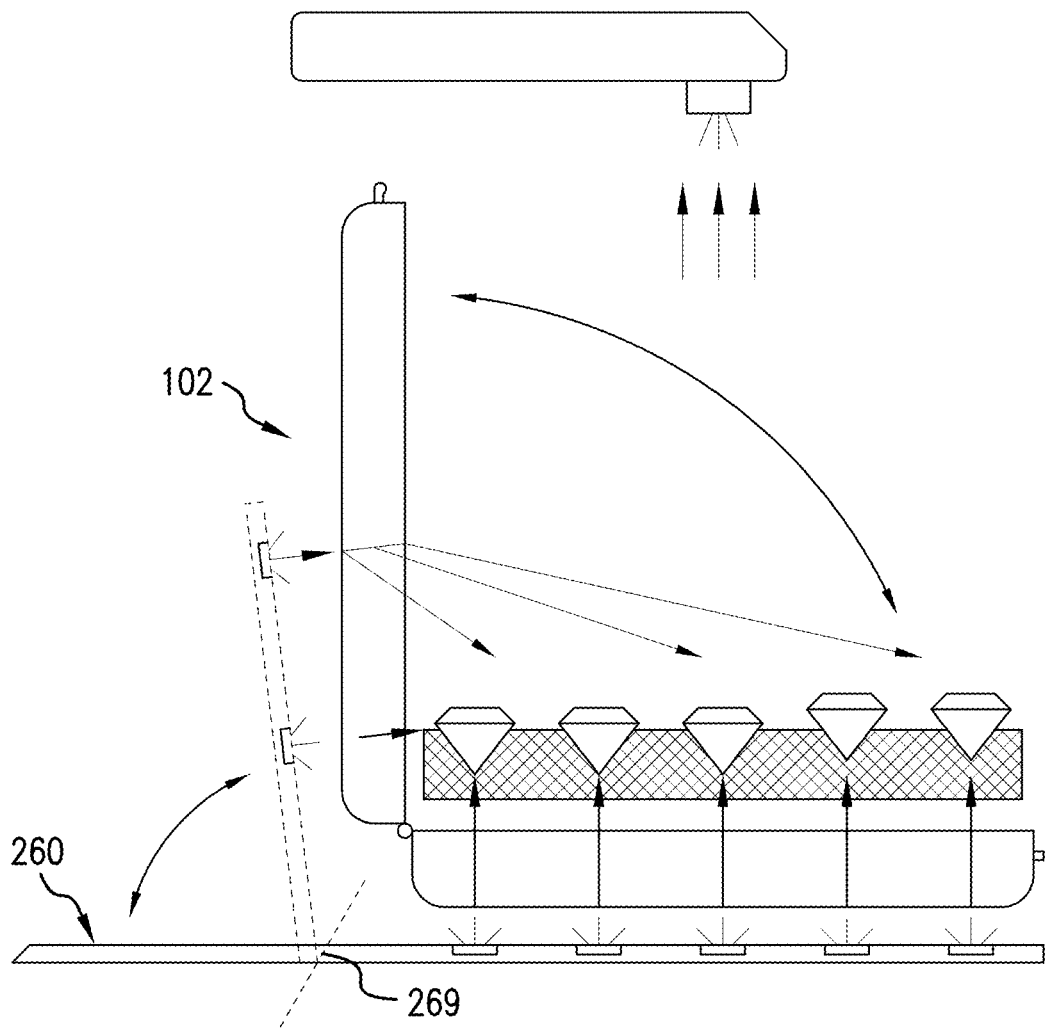
FIG. 2B is an exploded side view diagram of an example gemstone container and an illumination device, according to an embodiment.

In some embodiments, the mat 160 can be configured to be foldable. For example, the base substrate of the mat and the circuitry connecting the LEDs embedded therein can be made of flexible materials capable of being folded or bent, such as plastics and other such polymers. By way of further example, one or more flexible fold lines 169 can be formed in the mat so as to allow the mat to be folded along the fold line. As shown in FIG. 2B, which is a side-view of an alternative configuration of a lighting mat 260 with the container 102 thereon, the lighting mat can be configured to be folded along the fold line 269 so as to provide illumination through the side(s) of a container in some embodiments. The arrangement of the LEDs, and the possible movement of the LEDs relative to the gem container in some embodiments (e.g., through folding of the base along one or more flexible fold lines), can serve illuminate the gems in one or more of a multidirectional, unidirectional and cross-directional way, so the light waves can be directed in any direction needed.

In an embodiment, features and functions of the lighting platform can be integrated with the gemstone holder. For example, the illumination mat can be placed directly in the box.

Image Capturing and Gemstone Evaluation Device

Figure 3:
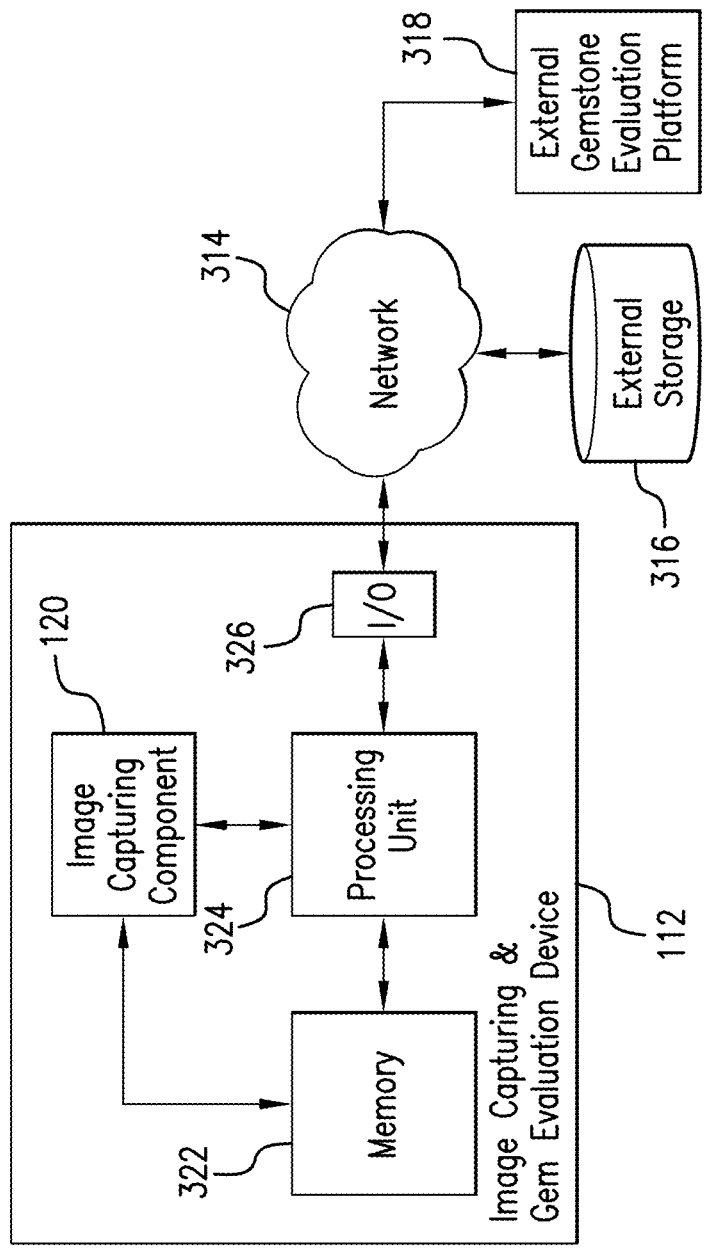
FIG. 3 is a conceptual block diagram of an example imaging and gemstone evaluation device of the system of FIG. 1A, according to an embodiment.

FIG. 3 is a block system diagram showing a more detailed view of the exemplary image capturing and gem evaluation device 112 of the system 100 and a communications network 314 and external storage 316 and a gemstone evaluation platform 318 in communication with the device 112 according to an embodiment. The image capturing and gem evaluation device 112 includes an image capturing component 330, a memory 322, a processing unit 324 such as a microcontroller or microprocessor, and an input/output (I/O) circuit 326.

The image capturing and gem evaluation device 112 can be any suitable device including the image capturing component 120 and configured to capture and process one or more images of the gemstones as described herein. In some embodiments, the image capturing and gem evaluation device 112 is a mobile phone, and the image capturing component 120 is a mobile phone camera. In other embodiments, the image capturing component 120 can include a macro lens to improve image quality, laser scanning technology, or other suitable systems for imaging a gemstone and/or jewelry item.

The memory 322 can be or can include a program memory and/or a random access memory (RAM), and stores image data received from the image capturing component 120 for processing by the processing unit 324.

The processing unit 324 processes the image data as described herein to evaluate the gemstones and/or to facilitate further processing via the I/O circuit 326 (e.g., a transceiver, network communications device and the like), the network 314, the external storage 316, and/or the external gemstone evaluation platform 318.

The network 314 can be a network such as the Internet, a cellular network, and/or any other type of suitable network (e.g., a local area network (LAN), a metropolitan area network (MAN), a wide area network (WAN), a mobile network, a wired or wireless network, etc.). The external gemstone evaluation platform 318 can be any suitable platform operated or otherwise controlled by an entity such as a gemstone dealer, a user that grades gemstones, or a gemstone evaluating entity such as a laboratory that evaluates gemstones to determine gradings and pricings used in sales of gemstones. The external storage 316 can be any suitable database or other storage component(s) operated or otherwise accessible by such an entity.

The foregoing exemplary embodiments of system 100 are shown and described for evaluating one or more gemstones placed in the container 102. For example, the captured image(s) of a given gemstone among the gemstones 150 can be used to identify and analyze inclusions among other physical characteristics of the gemstone. However, it should be understood that, additionally or alternatively, in some embodiments, multiple gemstones 150 situated inside the jewelry container 102 can be analyzed at the same time in accordance with the techniques described herein. Furthermore, in some embodiments, the exemplary systems and methods can be adapted to contain, image and analyze a jewelry item comprising one or more gemstones mounted in a setting of the jewelry item.

The algorithms for analyzing images of a gemstone and/or jewelry item configure the processor to extract one or more of a variety of physical characteristics from the images including, without limitation, one or more of the features listed below:

Inclusions in the gemstones
Scratches on the gemstones
Dust or particles on the gemstones
Table facet structure of gemstones
Girdle structure of gemstones
Gemstone girdle features
Angle and height of gemstones
Pavilion depth and angle
Crown height and angle
Weight and color of the gemstones
Cut grade and light return of the gemstones
Coverage of the gemstone surface area, i.e., is it too short (near edge) or too high (towards table) or correct distance
Identification markings or inscriptions on the metal part and gemstones
Metal part dimensions, volume, angle, color and weight
Metal quality/caratage
Nicks, scratches, dents, cracks on the metal part or gemstones
Distance between the prongs
How the prongs are placed in respect to one another and in respect to the gemstones
Height and thickness of the prongs
Facet structure and angles of the prongs
Angle of curvature of the prong and its angle (facing others) compared to other prongs
How high the gemstone is set in comparison to the prongs and to the other gemstones relatively
Placement of the gemstones in relation to the prongs The information mentioned above is exemplary and should not limit the scope of the invention. It should be clearly understood that the processing unit 324 can be configured to extract any other information from the gemstone images required for analysis of the gem and/or jewelry item.

Exemplary systems and methods for capturing and analyzing images for single or bulk processing of gemstone or jewelry items using machine vision and other techniques are shown and described in co-pending and commonly assigned U.S. Non-Provisional patent application Ser. No. 17/104,615, titled "SYSTEM AND METHOD FOR PROCESSING MULTIPLE LOOSE GEMSTONES USING IMAGE-BASED ANALYSIS TECHNIQUES" filed on Nov. 25, 2020, and U.S. patent application Ser. No. 16/678,043, titled "JEWELRY ITEM GRADING SYSTEM AND METHOD," filed on Nov. 8, 2019, each of which is hereby incorporated by reference herein in its entirety.

In one or more embodiments, the systems and methods disclosed herein can be used to quantify a cut grade and/or light return performance of a gemstone from an image captured using the system 100.

In general, the better the cut of a gemstone, the better its light performance. Currently however, cut grade and light performance are considered different features and given different values. Both measures have not been able to be quantified together. However, from an image of a gemstone taken using the system 100, particularly, embodiments of the gemstone holder 102, gemstone pad 140 and gemstone lighting platform 160, the gemstone analytical system 112 can objectively measure the clarity (or graininess/fuzziness) of the image of a gemstone and quantify the light return/light performance of the gemstone in real terms.

The better the cut of the gemstone imaged using the system 100, the clearer and brighter the image will be. If a gemstone is poorly cut, it will "leak" light, which can be captured by the imaging device 120 in the gemstone image as pixilation, wherein the level of pixilation is quantifiable. Put another way, a more poorly cut gemstone will result in a more pixelated, or less clear, or less sharp, or more static/fuzzy looking image. For instance, light leakage can show up in the diffused light image of a gem like small dots in and around the gem.

Figure 4:
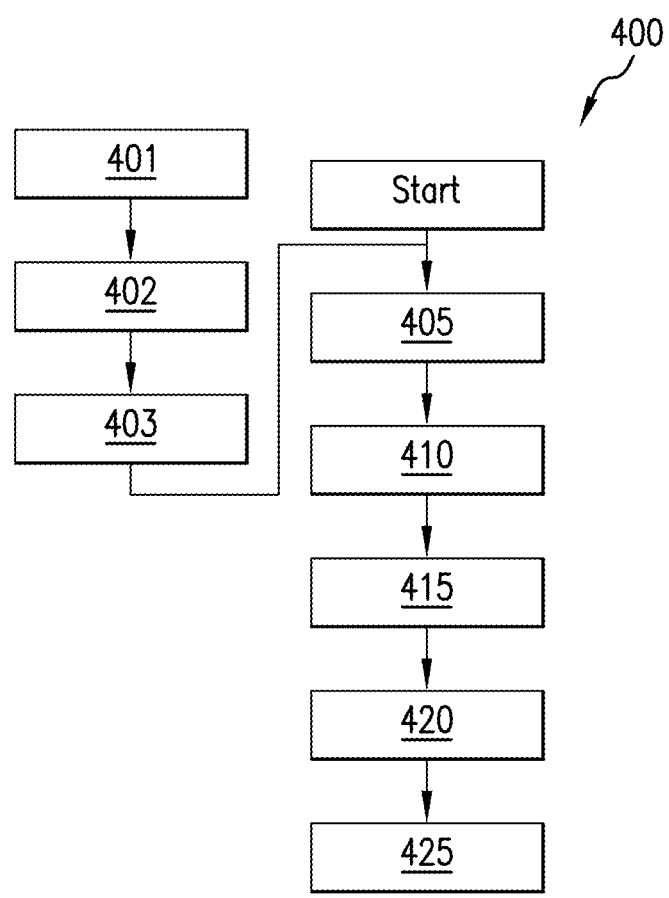
FIG. 4 is a process flow diagram of an exemplary routine for quantifying the cut grade and light performance of a gemstone using the system of FIG. 1A, according to an embodiment.

FIG. 4 is a process flow diagram of an exemplary routine 400 for quantifying the cut grade and light performance of a gemstone from an image captured using system 100 according to an embodiment. It should be understood that portions of this and other methods disclosed herein can be performed on or using a suitable custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 400 (or other disclosed methods) to be carried out. It should be noted that in other embodiments, the order of the operations can be varied, and that some of the operations can be omitted. The electronics can also include a user interface equipped with a touch screen (e.g., a touch screen of the image capturing and gem evaluation device, such as a touch screen of a mobile phone) to permit computer interaction.

At step 405, an image of one or more of the gemstones within the container 102 are captured using the image capturing component 120 of the gem evaluation device 112. As should be understood, step 405 can be preceded by steps for placing the gemstones within the container 102 (step 401), closing the top wall such that the gems are properly aligned and oriented within the container under the viewing window (step 402), and selectively illuminating one or more LEDs 164 of the lighting platform 160 to illuminate the gemstones from below or above as required by the particular analytical method being performed.

At step 410, the processing unit 324 of the gem evaluation device 112, which is configured by code executing in the processor, applies a gemstone finding algorithm on a captured image to find a gemstone within the image. Additionally, at step 415, the processing unit 324 can apply a gemstone analysis algorithm, such as an edge detection algorithm, to identify the gem's facet and inclusion structures.

Additionally, at step 415, the processing unit 324 defines one or more "halo" regions in and or around the gemstone. A halo specifies a region of interest within the image that corresponds to a facet location. Accordingly, a halo can have a fixed or varying size. In particular, at step 415, the processing unit can first identify, in the image, specular reflections caused by light reflecting off of respective facets of the gemstone. In an embodiment, specular reflections of interest can be detected based on pixel intensity, change in intensity and uniformity over an area. Additionally, the processing unit can be configured to define a respective halo region around the identified specular reflections. For example, the halo can be a region of the gemstone image that is centered on a region of the reflection with uniform and relatively higher pixel intensity but sized to encompass the surrounding area where intensity drops off.

In an embodiment, the processor of the gemstone evaluation device 112 can cause the image capturing component to adjust the camera focus to enlarge or otherwise enhance the specular reflections that are revealed in the images. In a manual setting, the user can be guided to move the camera toward and away from the gemstone. The adjustment of camera focus can also serve to highlight different sets of facets. Additionally, the images are preferably taken while the viewing window of the gemstone holder is closed such that the reflections appear on the viewing window and thus are more easily captured in the images. It can also be preferable that the primary source of illumination is directed at the gemstone from above the gemstone when grading cut grade using the exemplary halo technique. Additionally, it can be preferable that the gemstone is illuminated with white light.

Figure 10A:
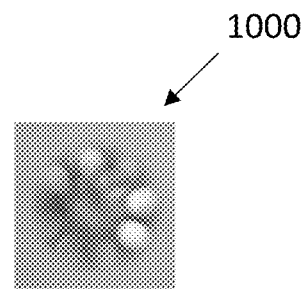
FIG. 10A is a top-view image of a gemstone taken using the system of FIG. 1A, according to an embodiment.
Figure 10B:
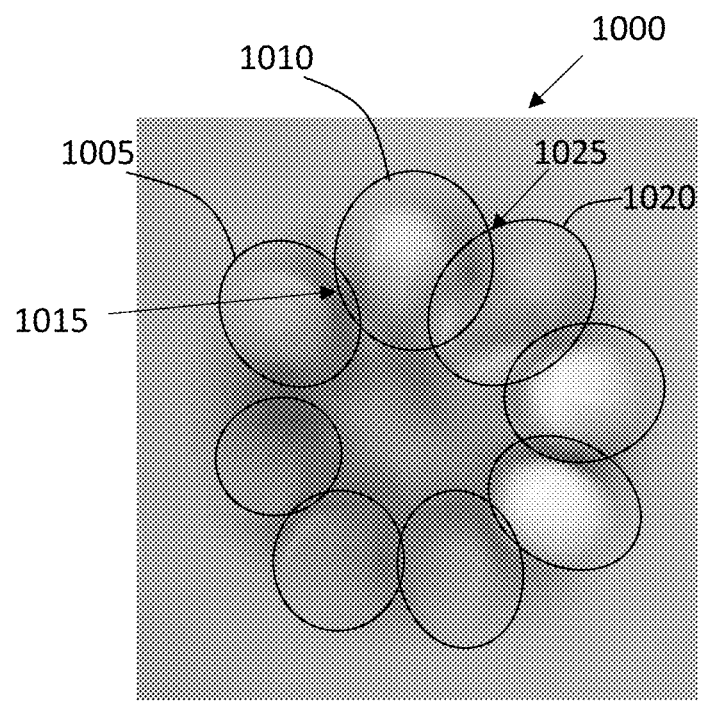
FIG. 10B is an enlarged top view of the gemstone image of FIG. 10A processed using the system of FIG. 1A, according to an embodiment.

FIG. 10A is an exemplary image of a round diamond captured using the system 100 with the camera focus adjusted to emphasize the appearance of specular reflections on the viewing window of the gemstone container. By comparison, an in-focus image will minimize reflections and reveal more of the detail of the gemstone structure, which can be preferable for other types of gemstone analysis. FIG. 10B is an enlarged version of the image of FIG. 10A and showing the specular reflections encompassed by respective halos superimposed over the image.

In this example, the halo regions can comprise a series of ovals, for instance, halos 1005, 1010, and 1020. The shapes of the halos however can vary depending on the shape of the gem and number of facets and faceting structure. As shown, these oval halos are defined in a way such that they can overlap each other, like a Venn diagram, forming a pattern of overlapping ovals with overlapping regions. For example, halos 1005 and 1010 define overlapping region 1015 and halos 1010 and 1020 define overlapping region 1025. Each oval can be located in relation to the location of a specular reflection, which in turn corresponds to the location of a facet, and is sized and shaped according to the reflection. As shown in FIG. 10B, the halo pattern includes eight ovals that correspond to eight similar facets of a gemstone.

At step 420, the processing unit analyzes the halo regions and the overlapping regions. Because uneven faceting or angles of facets will distort some of the reflections and corresponding halo regions more than others, the clarity of the overlap regions can thus be measured by the processor and used to determine the quality of the gemstone symmetry and cut. The clearer and more defined the reflections are the better the light return and cut grade. More specifically, in an embodiment, the processor can be configured to measure the brightness/intensity or change in intensity of the pixels in the overlapping regions as a measure of clarity.

Analysis of the halo, the overlapping regions or other regions of the gemstone can in some embodiments include calculating one or more of a clarity/graininess and a brightness/intensity. Clarity/graininess or brightness can be quantified on a pixel per area (e.g., inch) basis, for the area of a given halo, a given overlap region, one or more portions of the gemstone, or any combination or variation of the foregoing. The clarity/graininess in the reflections can be measured as pixels per sq. inch, for example, and can be used to quantify the light return of a gem.

Additionally, in some embodiments, the size and shape of overlapping regions can be compared to determine uniformity, as the more uniform the overlap regions the more uniform and better the cut. Similarly, the pattern that is formed by the halos and the overlapping regions can also be evaluated by the processor as a measure representing gemstone symmetry and cut. In some embodiments, the color of one or more of the regions in the image can be measured to determine a color of the gemstone, for instance, an average hue of pixels in a halo.

At step 425, the one or more measures for clarity, brightness and other characteristics measured at step 420 can be combined or translated into a value for the quality of the cut. Clarity and brightness can be absolute values or relative measures. For instance, clarity and brightness can be evaluated for multiple gems that are categorized by quality and used define a scale according to which an objective value can be given.

Although FIGS. 10A-10B show a single gemstone, the system 100 can capture images each depicting multiple gemstones in the gemstone container and can effectively process individual gemstones from images cropped therefrom. Thus, the disclosed embodiments can facilitate both individual and bulk processing of gemstones. In an embodiment, the processor can be configured to capture a sequence of images (e.g., a video feed) of the illuminated gemstones in the gemstone container while the imaging device is moved over the gemstones. As a result, the images are captured of the gemstones from multiple angles. Additionally, the processor can be configured to detect the specular reflections generated by respective gemstones in respective images and analyze the changes in the respective reflections throughout the sequence. For instance, the processor can be configured to analyze the change in intensity of the one or more reflections associated with a given gemstone (referred to as "light-points"). Additionally, the particular pattern of reflections that comprise a gemstone's light-point can be determined for respective gem images and the changes in the pattern through the sequence of images can be determined. Similarly, the reflected light intensity distribution over the area of the light-point can be measured from individual images and changes in the intensity distribution through a sequence of images can be evaluated. Based on the measured changes in shape and/or intensity distribution of the light-points, the processor can be further configured to measure the scintillation property of respective gemstones. Furthermore, in an embodiment, the processor can be configured to track the movement of the light-points throughout the sequence of images. Additionally, the processor can be configured to count the gemstones based on the light points or the tracking of a light point throughout the images. Moreover, the processor can determine from the tracked reflections.

The images captured using the system 100 provide additional benefits beyond facilitating the objective measuring of light transmission and related characteristic of cut quality. Indeed, under the diffuse lighting conditions achieved using the system 100, other gemstone features including, for example and without limitation, polish marks and faceting structure patterns, are more clearly visible and more clearly captured in the image. The discoloration or unevenness in color distribution in gemstones is also more clearly visible. Accordingly, the processing unit 324 can be configured to segment each of these features of the gemstone and quantify the attributes. Additionally, grades can be given for each of these attributes in a pixel strength or some other manner. In some embodiments, opacity or translucency of light through an inclusion and the surrounding light visible around the edge created around the inclusion can be recorded as well, thus defining the inclusion more clearly. This can be converted into a pixel strength based on the color and closeness of similar colored pixels of the inclusion.

The location specific and diffused light conditions generated using the system 100, including, embodiments of the gemstone holder 102, gemstone pad 140 and gemstone lighting platform 160, also serves to reduce glare. Since the glare is reduced, the imaging device 320 can focus better on portions of the gemstone. In some embodiments, the processing unit 324 can be further configured to utilize this improvement to perform a focus-based measurement of the coordinates (e.g., x,y,z coordinate location) of the inclusions and facet structures inside or on a gemstone, from any angle that the image was taken. For example, say, an inclusion on the top of the gemstone can be focused in/out on using the camera, and a lower level inclusion or facet structure can be similarly focused in/out on and the focal lengths for the two references used to determine the "Z" coordinate of the entire gem/inclusions/faceting structures/girdles etc.

Additionally, in some embodiments, the system 100 can be configured to image the gemstones while the imaging component 120 and gem container 120 are moved towards or away from each another, can also assist with revealing light reflections and other optical properties of the gemstone. Movement of the imaging component 120 can be performed automatically using, for example, a linear actuator that the image capturing component 120 can be mounted to and that is controlled by the processing unit 324.

Additionally, in some embodiments, the system 100 can be used to illuminate gemstones contained in a plastic bag, which are commonly used in the gem industry to hold loose gems. Specifically, a plastic bag with multiple loose gems can be placed flat on the diffused lighting pad 140 sitting on the illumination mat 160. The diffuse lighting created by the mat and pad causes the gems within the bag to become more well defined. As a result, a detailed stone "count" can be more effectively performed either in an automated fashion by the image capturing and gem evaluation device 112, or manually. This is not possible with traditional lighting systems. Indeed, even if the gems are bunched up quite closely or overlap within the plastic bag, the facets and girdles of respective gemstones show up well and can be more easily defined under the diffused lighting condition provided by the illumination mat and pad. The improvement in lighting can eliminate the need for removing the gems from the plastic bags.

Figure 5:
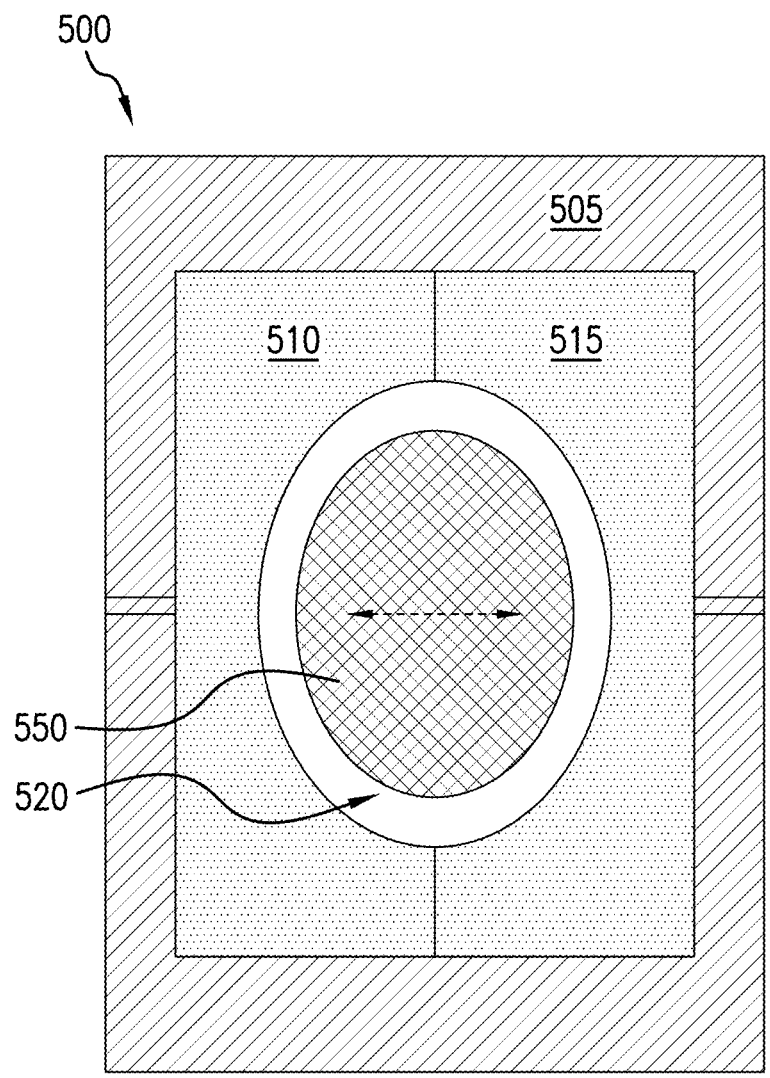
FIG. 5 is a top view of an exemplary configuration of an adjustable mask useable with the system of FIG. 1A, according to an embodiment.

In some embodiments, the system 100 further comprises a mask. The mask can comprise a planar material substrate having an aperture therethrough which is sized and shaped to correspond to the size and shape of a gemstone. Preferably, the mask is an adjustable mask wherein the aperture can be expanded and contracted to a desired size and shape. The mask is configured to be placed over a gem (e.g., on top of the viewing window) to minimize/reduce the glare on the imaging device caused by light passing through the container. In some embodiments, the adjustable mask comprises a planar substrate with a central opening. The mask further includes a series of overlapping "plates" that define the size and shape of a central aperture. The plates can slide relative to one another and the center of the aperture (e.g., expand or contract) in one or more directions, thereby allowing the mask to conveniently be adjusted to the size and shape of the gemstone. FIG. 5 is a top view of an exemplary configuration of an adjustable mask comprising a planar substrate 505. Two plates 510 and 515, are slideably attached to the substrate 505 and moveable along respective tracks in the directions shown by the arrow, thereby allowing for the plates to move towards or away from one another and define an oval aperture 520 sized and shaped for use with an oval gemstone 550, for example. It should be understood that the mask 500 can be suitable for an oval gemstone 550 round, oval or marquise shaped gemstones, for example. Although only two plates are shown, each respectively defining half of the oval aperture, it should be understood that additional plates can be provided (e.g., an opposing top and bottom plates in addition to the left and right plates shown. Additionally, the plates can be slideably attached to the substrate in a manner that provides additional directions of movement and adjustability.

Figure 6:
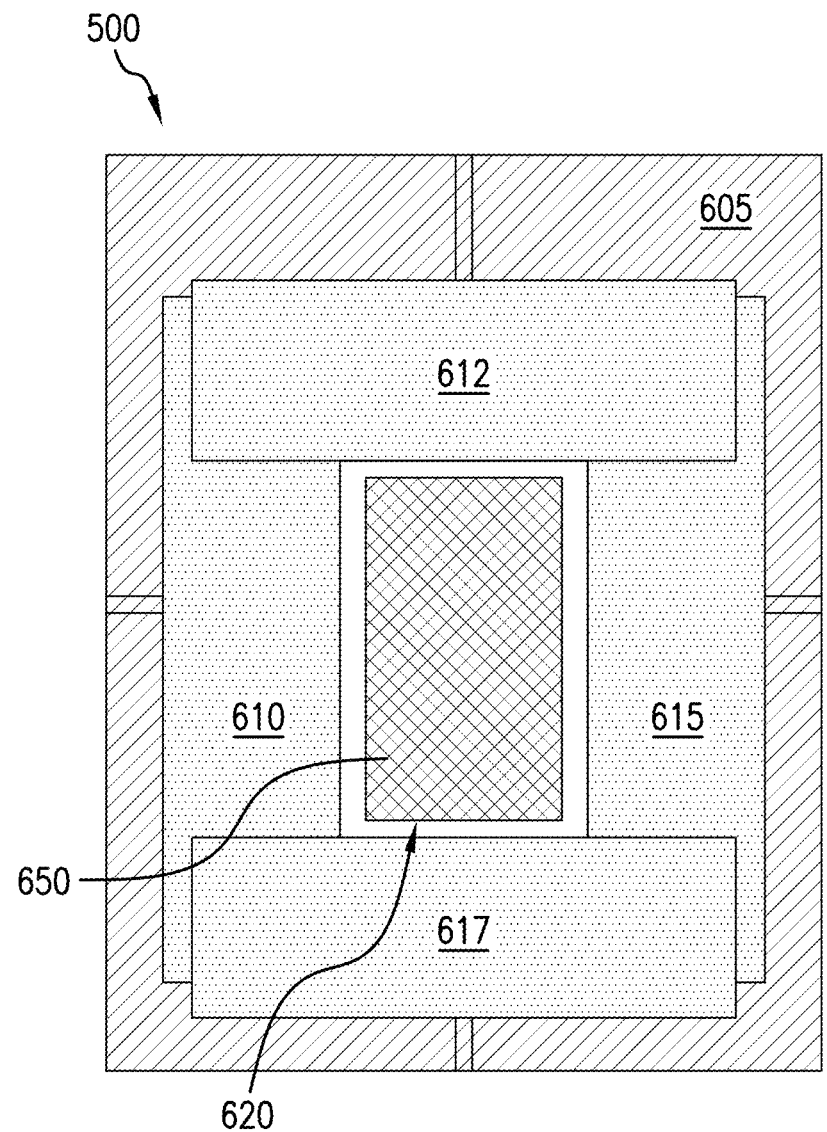
FIG. 6 is a top view of an exemplary configuration of an adjustable mask useable with the system of FIG. 1A, according to an embodiment.

By way of further example, FIG. 6 is a top view of an exemplary configuration of an adjustable mask 600 comprising a planar substrate 605 and, mounted thereto on respective tracks, left and right plates, 610 and 615, and top and bottom plates, 612 and 617. As shown the plates define an aperture 620 suitable for imaging a gemstone having a rectangular shape, e.g., rectangular gemstone 650.

In some embodiments, the plates of an adjustable mask can be moved independently. IN some embodiments, two or more plates can be mechanically linked to one another so as to move in unison. The mechanical coupling of the two or more plates can be further coupled to a control knob that, when turned, adjusts the position of the plates. While an adjustable mask having movable plates can be suitable for use with one or more gem shape. However, in some embodiments, a plurality of adjustable masks can be provided having respective plate arrangements to provide a respective aperture more closely matching one or more gemstone shapes. For instance, a first mask e.g., mask 500, can be provided for use with gemstones having rounded shapes (e.g., round, oval, marquise), and a second mask, e.g., mask 600, can be provided for use with gemstones having square shapes (e.g., square, rectangle, princess, emerald, baguettes), and so on.

In an embodiment, the viewing window of the gemstone holder can be configured to include certain etching or markings in/on it. For instance, markings can define a coordinate system according to which the gemstone evaluation device 112 is configured to assign location coordinates to respective gems among the gemstones. By way of further example, the markings can define a distance scale that is useable by the gemstone evaluation device 112 to measure the size of the gems.

In another embodiment, the top portion of the container 102 can have a lift-off configuration that can be press fit onto the bottom portion and otherwise unattached, so as to allow the top portion to be completely separated from the bottom portion. In addition or alternatively, other mechanical fastening means can be used to removably attach the top portion to the bottom portion including, for example and without limitation, screws, snaps, locking tabs, and the like.

In some embodiments, the container can further comprise a slide, e.g., a glass substrate or other transparent material configured to be placed over the open bottom portion of the container so as to maintain the gems in position during imaging of the gemstones. For example, if the top wall of the container is open or removed, or if the top wall is a material that is prone to scratching during normal use, a transparent, scratch resistant slide can be included for placement on top of the gems to facilitate imaging.

In some embodiments, the viewing window can further comprise a magnifying glass/lens. The lens can be in some embodiments integral to the viewing window. Alternatively, the lens can be configured to be moveable over the viewing window.

In some embodiments, the gemstone container 102 can further comprise a label configured to be placed against a bottom wall or side wall of the container. For instance, a printed label can be affixed to a thin cardboard or plastic substrate and inserted into the container with written side facing a transparent wall of the container (e.g., the top viewing window). This way there is no need to remove sticky labels from the box itself. In use, this cardboard and label may simply be removed to allow the light to pass through at time of verification and then replaced after the process is done.

In an embodiment, the gemstone illumination mat 160 can be sized and shaped to fit within the internal volume of the gemstone container 102. In particular, the gemstone illumination mat can be provided between the bottom wall of the container 102 and the gemstone pad 140. In another embodiment, one or more components of the gemstone illumination mat (e.g., the LED array) can be integrated within the bottom wall of a gemstone container.

Figure 7:
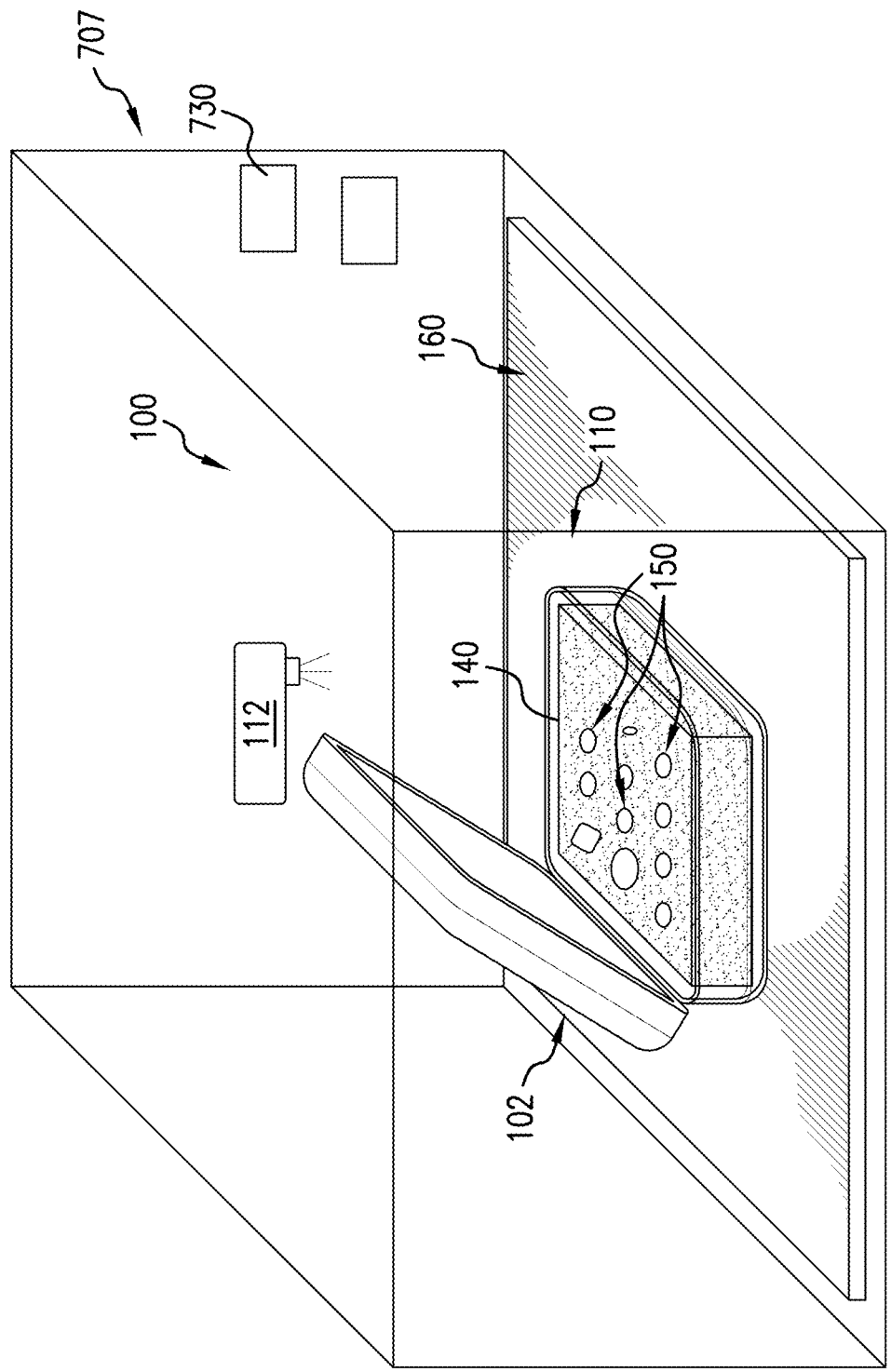
FIG. 7 is a top view of an exemplary configuration of an adjustable mask useable with the system of FIG. 1A, according to an embodiment.

In some embodiments, an outer casing can also be provided to contain one or more components of the system 100, for example, to allow the imaging device to be mounted on securely for steady imaging and or for moving/hovering over the container and gems. FIG. 7 is a perspective view of the system 100 provided within an outer casing 707 according to an embodiment. For simplicity, FIG. 7 shows the sides of the casing 707 as being transparent.

The exterior casing can be a box like structure or circular or any suitable shape for containing components of the system 100 and allowing for imaging a gemstone container, jewelry item. The casing can support the imaging device(s) either parallel to the gemstone container 102 or jewelry item or at an angular mode to allow sides of such items or curved items to be imaged.

In some embodiments, the casing 707 can have an opening on one or more sides to allow easy access to the system included therein. In some embodiments, the casing can be covered on one or more sides, for example, with a diffuser material (e.g., a white cloth) or a dark material (e.g., black cloth) to stop external lighting from entering into the internal volume of the casing.

It should be understood that the casing and system integrated therein can be configured to include other device holders or photography improving devices as needed.

In some embodiments, the casing 707 or lighting mat 110 can further comprise a heating element 730, such as heating coils, fans or other thermal energy or light (e.g., infra-red emitters) radiators. Such devices can be configured to heat a jewelry item, such as its metal parts like gold and silver and gemstones. Additionally, cooling devices (not shown), such as a cooling fan or liquid spray can be provided within the casing 707 to cool the jewelry items. In an embodiment, the gem evaluation device 112, particularly the imaging device 120 (not shown) can also comprise a thermal imaging device configured to capture thermal imagery of the jewelry item. Additionally, the thermal imaging data can be processed by the gem evaluation device 112, particularly the processor, to measure the difference in heat absorption (and cooling) to identify the metal, metal types, gemstone, gemstone types and the like, each of which have a unique thermal signature. This signature may be captured using a suitable thermal scanner or imaging device. The resulting thermal image(s) can be used to process and find locations of the gem, metal parts/structures, prongs etc. of the jewelry item and segment each item. The processor can be further configured to use this information in conjunction with a "normal" image, using the heat separation to assist in segmenting the metal from the gem in the images. In some embodiments, the processor can be configured to generate a 3D image of the jewelry item and generate a diagram of the whole item. Pixel to pixel of thermal image to normal image.

In some embodiments, a spray or chemical coating with a heating sensitive chemical or color changing chemical, can be applied to the jewelry item to better show its thermal signatures.

In some embodiments, the heating element can be in direct contact to the metal or other part of one or more jewelry item. As such, the speed of heating various parts or transmittance of the heat through the item can be sensed, measured and/or image by the gem evaluation device 112 and can also be used to determine what elements/metals are used in the jewelry item.

In some embodiments, the light emitters/LEDs 154 can be configured to emit light having different characteristics. More specifically, different lighting colors and types can be selectively radiated onto the metal or gem parts of a jewelry item while images are captured under each lighting condition using the image capturing component 120. Additionally, the processing unit 324 can be configured to analyze images captured under different lighting conditions to identify characteristics of various portions of the jewelry item and/or gemstone. For example, two or more images can be combined by the processing unit 324 to create an image based on the lighting differences in the two or more images. Certain lights can highlight certain things in say the metal like porosity and also reduce uneven light conditions that leave shadows on the metal surface. Accordingly, the combination of image data captured under different lighting conditions can result in a cleaner and sharper image that is usable to better identify the metal and/or gems and portions thereof.

The foregoing elements can be used together jointly or separately to segment and batch process gemstones, jewelry items and the like.

Figure 8:
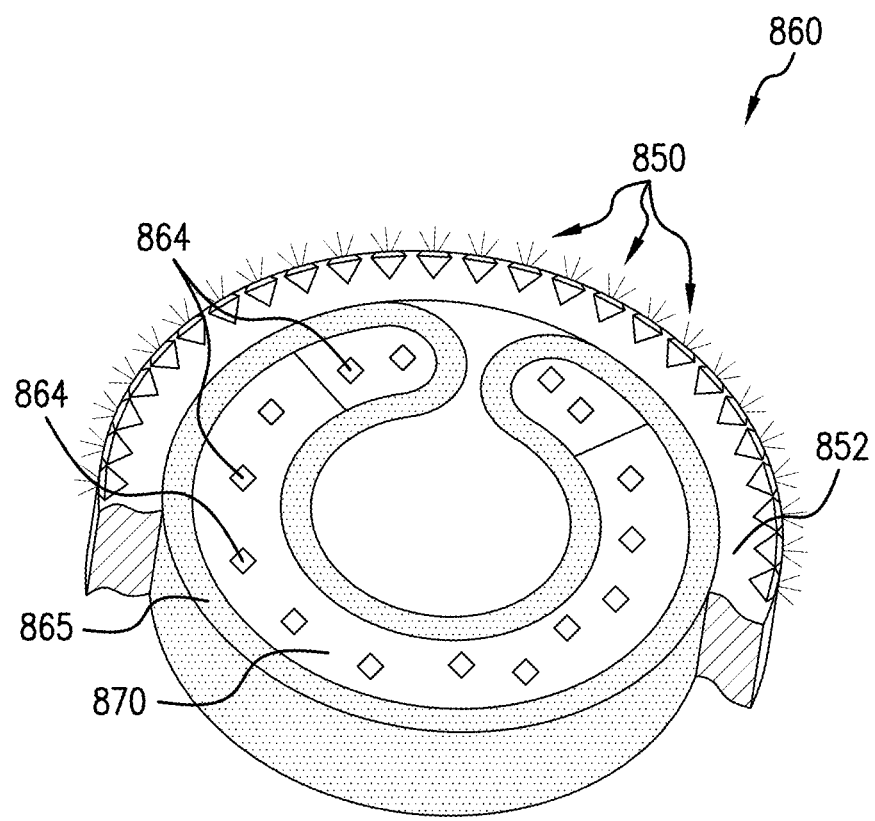
FIG. 8 is a cut-away cross-sectional side view of an exemplary illumination device, according to an embodiment.

In another embodiment, the lighting mat can comprise a foldable base that can be folded into various two or three-dimensional shapes that can facilitate illumination of a jewelry item and gemstones set in the jewelry item. For example, FIG. 8 is a cut-away cross-sectional-view of an exemplary lighting mat 860 rolled into a cylindrical shape. As a result, when rolled into the cylinder as shown, a jewelry item such as a bracelet 852 including gems 850 set therein can be placed around the cylindrical lighting mat 860.

The exemplary mat 860 comprises LEDs 864 embedded within a flexible base substrate layer 870. The LED's are arranged in an array extending substantially over the area of the mat 860. The LEDs are configured to emit light outward from or through one or more outer surfaces of the base layer 870. In an embodiment, the LEDs can shine through a top surface of the base substrate layer 870. In addition or alternatively, the LEDs can shine through a bottom surface of the base substrate layer 870. In addition or alternatively, the LEDs can shine through a side surface of the base substrate layer 870. Although not shown in FIG. 8, the length or width of the mat 860 can be between 1 inch and 5 inches.

In an embodiment, one or more outer layers 865 of the lighting mat also preferably comprises a soft material layer that diffuses the emitted light. For example, the same material(s) that can be used for the diffusing pad 140 can be used to provide a suitably compressible, soft and light diffusive outer material layer 865.

Similarly to the exemplary configuration of the lighting mat 160, one or more of the LEDs 864 can be selectively illuminated by control circuitry. For example, only those LEDs under the bracelet can be illuminated to concentrate the light through the gems of the bracelet and facilitate examination, imaging and analysis of the gemstones on the bracelet.

In some embodiments, the lighting mat 860 can further comprise one or more openings (e.g., slits or slots) through an outer surface that are configured to allow light more directly through the one or more slits/slots.

In addition or alternatively to providing a flexible base substrate that can be rolled into the desired shape, in some embodiments, the illumination platform can comprise an illumination device having a permanent three-dimensional shape. For instance, a more rigid base substrate material can be permanently formed into the shape of a ring sizer. The LED array can be embedded within the base substrate and configured to selectively emit light through one or more portions of the cylindrical outer surface of the base substrate. Additionally, a suitably compressible and light diffusive outer material layer can be provided over the outer surface of the cylindrical base substrate.

Figure 9:
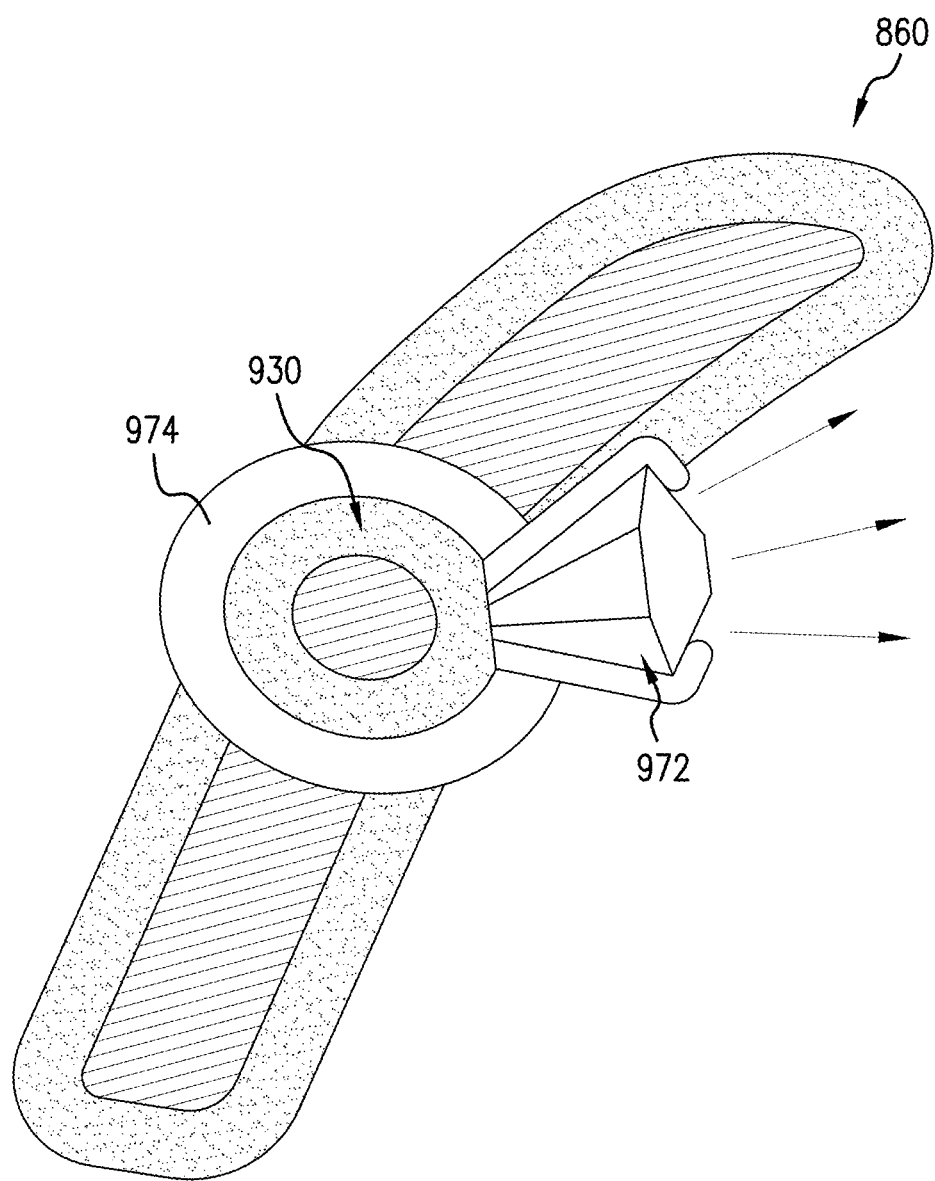
FIG. 9 is a top perspective view of an exemplary illumination device, according to an embodiment.

In some embodiments, such a ring-sizing structure can be integrated into a flexible lighting mat. For instance, FIG. 9, depicts a top-view of an illumination device 910. The illumination device 910 comprises the flexible mat 860, which is shown in a generally flat configuration. However, in the configuration of FIG. 9, the mat 860 is modified to also include a ring sizing structure 930 protruding from the top surface of the mat 860. As shown, the ring sizing structure 930 is configured to receive the metal part 974 of the ring there-around. Furthermore, one or more LEDs (not shown) within the ring structure can be selectively illuminated to emit light radially outward from the ring structure through the gem 972 of the ring. Additionally, one or more LEDs (not shown) of the mat 860 located under or around the ring can be selectively illuminated to illuminate one or more of the metal part or the gem from one or more additional angles. Thus, the device 910 can assist with showing the inclusions or surface texture of the metal or gemstone parts more clearly.

In one or more embodiments, a method for imaging and verifying one or more gemstones using the exemplary gemstone container, lighting, imaging and analysis system 100 is provided. One approach to verifying that a gemstone imaged at time T2 (e.g., after gemstone is received back into inventory) is indeed gemstone that was previously imaged and analyzed at time T1 (e.g., before sending the gemstone out to a third party) is to perform a comparison of one or more image(s) taken at T1 with one or more images taken at T2. More specifically, sets of images taken at T1 and T2, respectively, can be used to perform picture-to-picture or diagram-to-diagram comparison. Assembling the data set captured at a given point in time for comparison with another such data set can involve stacking layers of images of the gemstone(s) or specific portions and features thereof, wherein individual layers include specific sets of feature information and collectively represent a composite set of features of the gemstone(s). The image stack can then be compared against previously stored image stacks to identify differences or similarities. A similar stacking approach can be applied to generate and compare diagrams of gemstone features extracted from the sets of gemstone image(s). However, one problem with stacking is that if one or more of the "stacked" images is incorrectly taken and/or there is a layer that is missing or unfocused, the computer-vision comparison algorithms tends to either completely ignore the object or classify it as different. Also, the foregoing approach typically requires that the images are captured with a steady imaging device and from only one perspective/direction.

To overcome this tedious and difficult method of imaging, according to an embodiment, the gemstone imaging and gemstone analysis device 112 can be configured to implement AR augmented reality and other computer vision techniques to guide the operator and capture images in real time ("after images") for comparison with previously captured and stored images ("before images") without stacking them. The exemplary methods disclosed herein can be implemented even with images taken with a conventional smartphone, with a smartphone and macro lens, or any suitable imaging device.

The gemstone analysis device processor 324 can be configured to compare, in real time, the captured "after" image of a gemstone stored in memory 322 with "before" images stored in database 316 to check if a similar gemstone is recognized in the database. The before/after image information stored can include a stored image or coordinate file like a json file. Further, in some embodiments where multiple gemstones 150 within the container 102 are imaged together, the device processor 324 can be configured to analyze an after-image taken of the gemstones to identify coordinates of a particular gemstone being analyzed, and can be further configured to use that location to. In such an embodiment, the container preferably includes visual markings defining coordinates that can help further find exact location of a gemstone within a container, as noted previously.

Further, in some embodiments, if an image or portion thereof is out of focus, the device processor 324 can be configured to use image processing algorithms to bring the pixels into focus. The processor 324 can further be configured to use the focused or unfocused image to find a similar looking focused or unfocused image in the database. The images can further be in color or in greyscale and, in some embodiments, those color or greyscale pixels can be used to verify the shape and density of the pixels and to match to a similar looking/pixelated or colored object.

This way, the configured processor can either eliminate stacking or build a consolidated model of how a gemstone, or a gemstone feature like an inclusion or other such object, looks like in or out of focus and save those features as a consolidated image, or as features specially for that image in the database to reduce the data saved. Furthermore, in accordance with the foregoing, the consolidated model can comprise the coordinates and any other features it can gather.

In some embodiments, to gather the set of feature data, the processing unit 324 can use augmented reality technology to guide the operator of the imaging device to move the camera. In some embodiments, the processing unit can be configured to direct the operator to move the lens of the image capturing component 120 relative to the imaged item (or vice versa) including, for example, toward or away, or around, while the imaging capturing component captures a stream of images in real time (e.g., as a video or sequence of individual images). The processing unit 324 can further be configured to identify interesting features of the gemstone from the imagery, like an inclusion, extract data sets from the images relating to that feature, and save the multiple sets of data specially for that feature in the database.

This exemplary approach is particularly helpful where a user does not have access to stacking software or cannot capture reliably stable images of a gemstone. In some embodiments, the image capturing and gem evaluation device can also be configured to allow the user to tap and select a particular feature of interest, or can incorporate automatically choose and focus on a specific feature of a gemstone as needed. Additionally, in an embodiment, the processing unit 324 can be configured to search the database records for one or more specific features of a gemstone. For example, if a gemstone being imaged has two or more interesting features, say an inclusion at a measured coordinate and a particular color, the processing unit can be configured to find a gemstone in the database having the inclusion at the measured coordinates and then further match by color. It should be understood that the comparison can be performed in reverse, namely, to determine whether a particular previously recorded gemstone feature (e.g., inclusion at coordinate xyz) matches the one or more gemstones presently being imaged. In this manner, the system can be configured to search and find a specific feature in a specific place as might be specified by a user input.

The foregoing exemplary method for real time imaging and analysis also helps in extracting useful information from images taken from any angle and in motion as well. Similarly, out of focus images can be used, as well as pixelated images.

Additionally, capturing images from multiple perspectives enables features to be located in a third dimension (e.g., along the vertical "z" axis in addition to the x and y plane). Such information cannot be reliably extracted from a stacked photo captured from a single angle. More specifically, the processing unit 324 can be configured to detect a gemstone feature and how "deep" it is relative to the top surface to the bottom of a gemstone. Depth can be determined, for example and without limitation, based on absolute distance, relative distances, depth-from focus and focal planes, and other mathematical and geometry principles in real time. Such visual depth information can be further enhanced with data measured in tandem using distance or depth measuring sensors, such as LIDAR-laser distance and ranging devices, sonar sensors or other suitable distance or depth measuring devices useable to measure the distance of a target (or portion thereof) from the image capturing component 120.

In addition, based on the foregoing exemplary imaging and analysis method, the processing unit can be further configured to generate a 3D image of an object from the images captured from multiple perspectives.

At this juncture, it should be noted that although much of the foregoing description has been directed to a gemstone container, lighting system, imaging device and methods for gemstone analysis using same, the systems and methods disclosed herein can be similarly deployed and/or implemented in scenarios, situations, and settings far beyond the referenced scenarios. It is to be understood that like numerals in the drawings represent like elements through the several figures, and that not all components and/or steps described and illustrated with reference to the figures are required for all embodiments or arrangements.

Thus, illustrative embodiments and arrangements of the present systems and methods provide a system, processes and computer implemented control methods, computer system, and computer program product for fault detecting and fault handling in an industrial monitoring and safety system. The flowchart and block diagrams in the figures illustrate the architecture, functionality, and operation of possible implementations of systems, methods and computer program products according to various embodiments and arrangements. In this regard, each block in a flowchart or block diagrams as it relates to a computer implemented method can represent a module, segment, or portion of code, which comprises one or more executable instructions for implementing the specified logical function(s).

It should also be noted that, in some alternative implementations, the functions described herein or noted in a block diagram may occur out of the order noted. For example, two blocks or operations shown or described in succession may, in fact, be executed substantially concurrently, or may sometimes be executed in the reverse order, depending upon the functionality involved. It will also be noted that functional blocks or operations can, where applicable, be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A gem evaluation system, comprising:
a container for holding one or more loose gemstones, including:
one or more walls encompassing an internal volume of the container; and
a gemstone pad, provided within the internal volume of the container, for receiving the one or more loose gemstones on a top surface of the gemstone pad, wherein the gemstone pad is formed of a compressible material configured to allow light to pass through the compressible material into the gemstones, and
wherein the gemstone pad comprises voids formed in at least the top surface, wherein the voids have a sized suitable for holding at least a bottom portion of at least one of the one or more loose gemstones therein.

2. The system of claim 1, the one or more walls including a top wall comprising a transparent viewing window through which the one or more gemstones can be evaluated, and the container further comprising a bottom portion.

3. The system of claim 1, wherein the gemstone pad is white in color and is made of one or more of a microfiber cloth, a polymer foam and compressed cotton.

4. The system of claim 1, wherein at least a portion of one of the one or more walls are one or more of transparent and translucent to permit illumination of the internal volume through the at least the portion of one of the one or more walls.

5. The system of claim 2, wherein a top portion of the container including the top wall is separable from the bottom portion so as to transition the container between an open state in which the internal volume of the container is accessible and a closed state in which one or more gemstones are enclosed within the internal volume of the container.

6. The system of claim 5, wherein the gemstone pad is sized such that, when the container is in the closed state, a bottom surface of a viewing window compresses the one or more gemstones into the gemstone pad, thereby holding the gemstones in place and abutting the bottom surface.

7. The system of claim 1, wherein the gemstone pad has a compressibility that is suitable for resisting at least one of the one or more loose gemstones embedding completely within the gemstone pad.

8. The system of claim 1, wherein the gemstone pad is one of a translucent material configured to diffuse light shone into the pad and a substantially transparent material.

9. The system of claim 1, wherein the gemstone pad has a substantially uniform color.

10. The system of claim 1, wherein the gemstone pad comprises multiple layers of material including a bottom layer and a top layer.

11. The system of claim 1, further comprising:
an illumination device including:
a base having a top surface on which one or more of the bottom wall of the container or the gemstone pad can rest during gemstone evaluation;
an array of light emitters disposed within the base and configured to emit light from at least the top surface of the base and thereby illuminating the internal volume of the container.

12. The system of claim 11, wherein the illumination device further comprises:
a controller operatively connected to the array of light emitters and configured to selectively illuminate one or more of the light emitters to define an area of the top surface from which light is emitted.

13. The system of claim 12, wherein the controller is configured to control a parameter of the one or more light emitters, wherein the light parameter includes one or more of an intensity and a wavelength of light.

14. The system of claim 11, wherein the plurality of light emitters are arranged in a rectangular array.

15. The system of claim 11, wherein the illumination device further comprises:
an input/output circuit, operatively connected to the controller, wherein the controller is configured to receive control inputs via the input/output circuit, and wherein the controller is configured to selectively illuminate the one or more light emitters as a function of the control input.

16. The system of claim 11, wherein the illumination device's base further comprises a flexible fold line along which a portion of the base and embedded array of light emitters can be pivoted relative to another portion of the base and embedded array of light emitters.

17. The system of claim 16, wherein the illumination device's base is made of a flexible material.

18. The system of claim 1, further comprising:
a gemstone imaging and evaluation device, including:
an image capturing device configured to capture an image of the one or more gemstones through the viewing window of the container;
an external storage component configured to store data corresponding to the image; and
a processing unit configured to:
analyze the image of the jewelry item to identify, within the image, at least one of one or more features of the gemstone.

19. The system of claim 1, further comprising: wherein at least one of the one or more walls define an opening through which the one or more gemstones can be passed through.

* * * * *